Feb. 21, 1956 J. GALKIN Re. 24,121

PULLER FEED CARRIER ATTACHMENT

Original Filed Aug. 27, 1951 2 Sheets-Sheet 1

JOSEPH GALKIN
INVENTOR

BY Joseph Blacker
ATTORNEY

PULLER FEED CARRIER ATTACHMENT

Original Filed Aug. 27, 1951 2 Sheets-Sheet 2

JOSEPH GALKIN
INVENTOR
BY Joseph Blecker
ATTORNEY

United States Patent Office

Re. 24,121
Reissued Feb. 21, 1956

24,121

PULLER FEED CARRIER ATTACHMENT

Joseph Galkin, New York, N. Y.

Original No. 2,692,568, dated October 26, 1954, Serial No. 243,824, August 27, 1951. Application for reissue July 5, 1955, Serial No. 520,169

4 Claims. (Cl. 112—214)

Matter enclosed in heavy brackets [ ] appears in the original patent but forms no part of this reissue specification; matter printed in italics indicates the additions made by reissue.

This invention relates to a puller feed sewing machine attachment and has for its general object the provision of a device of this character by which to more suitably accomplish the installation and operation of a puller feed roller for augmenting the feeding action of the feed-dog when feeding heavy fabrics.

An object of this invention is to provide an attachment and associated drive mechanism of a novel arrangement whereby to install the mechanism on a sewing machine having a die cast frame and without any cutting up or damaging of the die cast frame.

Another object of this invention is to pivotally mount the upper roller to facilitate alinement or coaction with the lower roller when operating on uneven surfaces and to facilitate the regulation of the roller movement in accurate coordination with the feed-dog mechanism of the sewing machine so as to produce work of an entirely satisfactory nature.

Another object of my invention is to provide a puller feed attachment having an improved mounting by which the feed roller may be moved to ineffective position from the work so that the machine may feed only with the feed-dog.

With the above and other objects in view, the invention will be hereinafter more particularly described, and the combination and arrangement of parts will be shown in the accompanying drawings and pointed out in the claims which form part of this specification.

Reference will now be had to the drawings, wherein like numerals of reference designate corresponding parts throughout the several views, in which.

Figure 1:
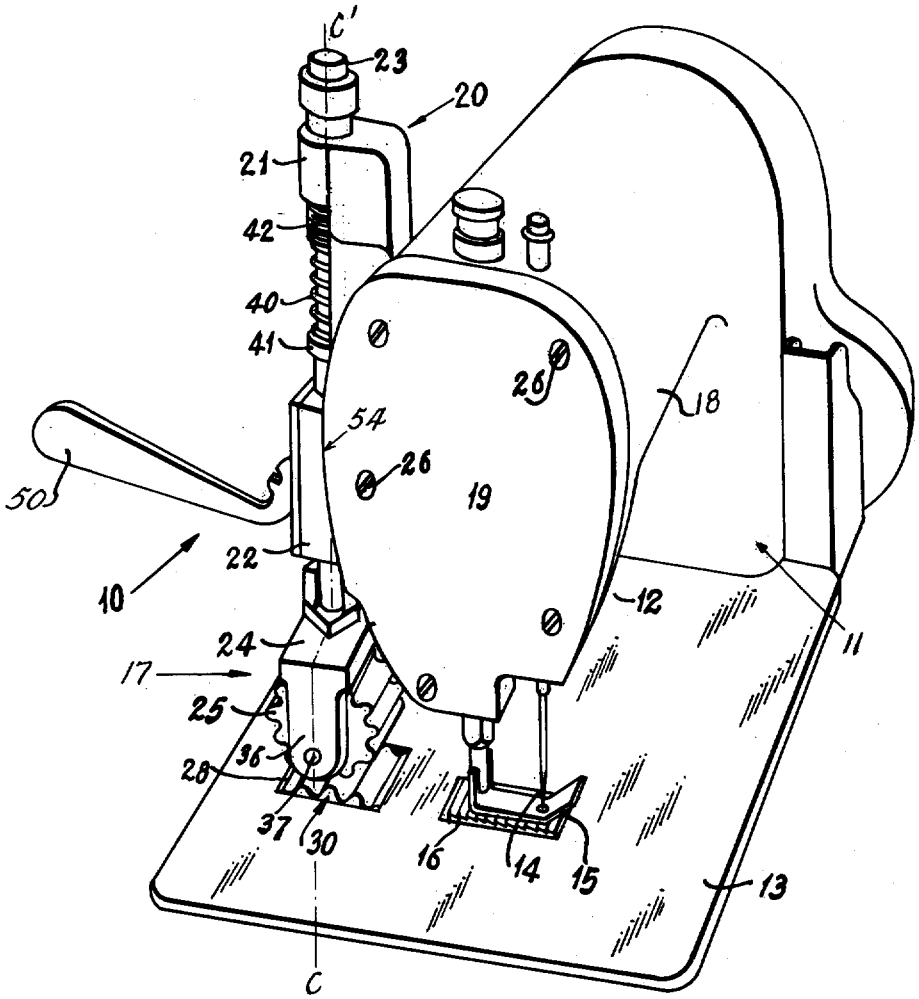
Figure 1 is a perspective view of a sewing machine having a die-cast frame to which my invention is applied.
Figure 3:
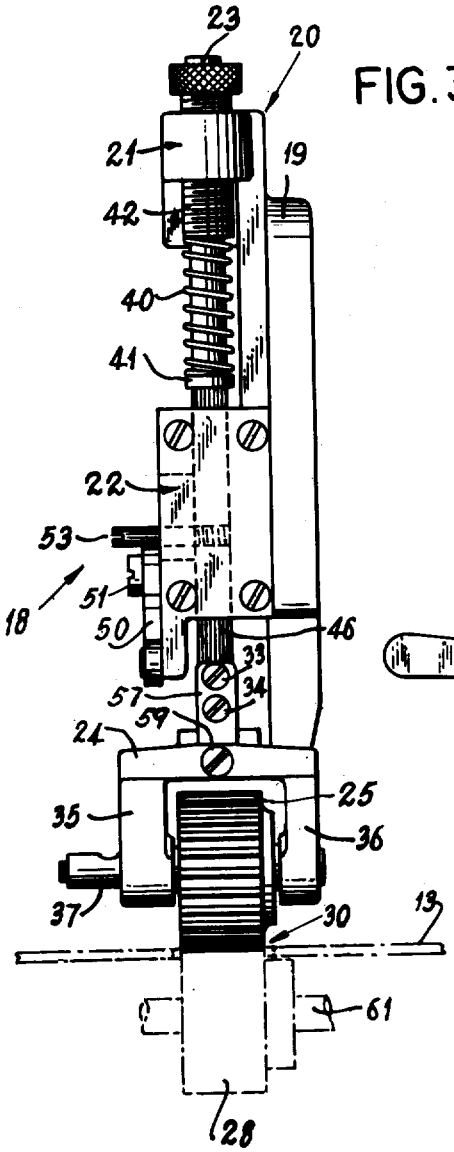
Figure 3 is a rear view of the carrier attachment shown in Figure 2.
Figure 2:
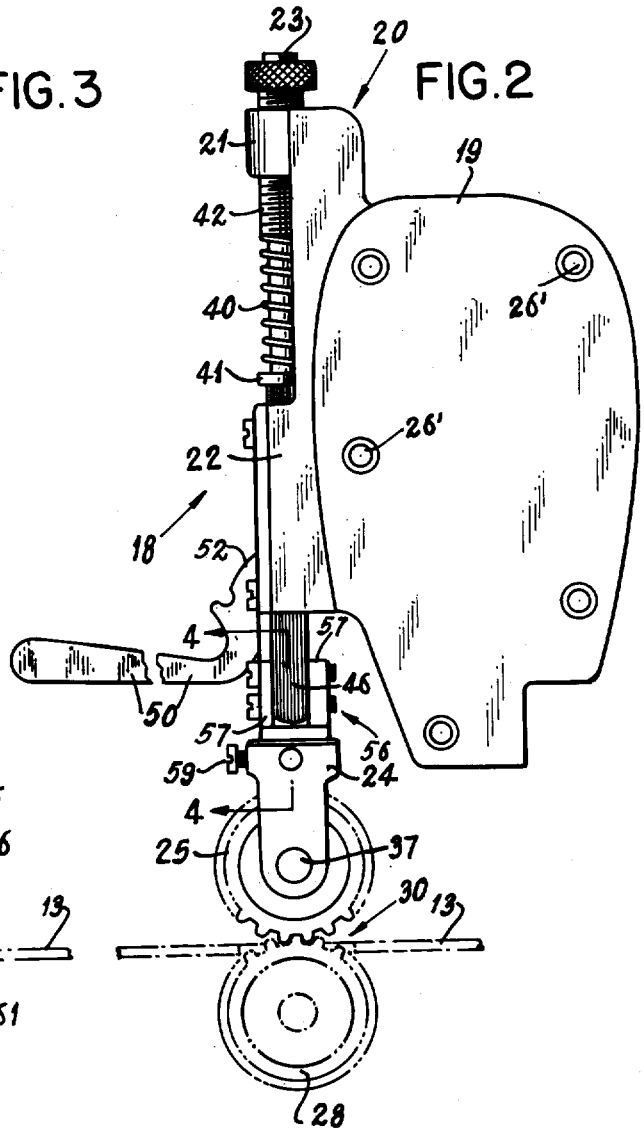
Figure 2 is an end view of a carrier attachment comprising an end plate attachable to the head of the sewing machine shown in Figure 1.

In the illustrated embodiment of the invention, the numeral 10 indicates a flat bed sewing machine having a die cast frame 11 overhung to support the sewing head 12. The frame 11 is integral with the flat work supporting base 13 of the sewing machine.

The head 12 of the sewing machine 10 is hollow and carries a needle 14 and a presser-foot 15. Cooperating with the needle beneath the work support is a looper. The fabric being stitched is fed across the work supporting base 13 by a main feed-dog 16 actuated by feeding mechanism well known in the art.

For feeding heavy fabrics, puller feed rollers are associated with the main feed for aiding in the feeding of the material to and from the stitching mechanism. In practice it is found desirable to install a puller-feed attachment to a sewing machine having a die-cast frame after the machine is completely built but heretofore this has not proved feasible because die cast metal is too weak to drill into and to support a puller feed mechanism which is subjected to considerable forces.

I have found that by making a carrier attachment 17 secured to the arm 18 and comprising a plate 19 functioning as an end plate or cover plate of the sewing machine head 12 and having an integral bracket 20 including an adjustable upper spring mounting 42 and a lower vertically elongated bearing 22 extending from the rear wall of the end plate that I can safely and resiliently support a carrier rod 23 carrying a yoke bracket 24 providing a unitary mounting for an upper toothed feed roller 25.

The plate 19 is secured to the head 12 solely by end plate screws 26 which pass through clearance apertures 26' in the plate 19 and are threaded into threaded apertures in the head 12, along the length thereof and provided for the usual end plate of the sewing machine, and without any necessity of drilling holes and without any cutting up or damaging of the die cast frame 11.

As shown in Figure 1, it will be readily seen that the screws 26 and the entire carrier attachment 17 may be removed to permit the sewing machine to be operated solely by the stitching and feeding mechanism thereof.

The carrier rod 23 is slidably mounted for vertical reciprocatory movements in the bearing 22. Cooperating with the upper toothed feed roller 25 is a lower toothed feed roller 28. The work supporting base 13 has an opening 30 whereby the toothed lower feed roller 28 may be mounted beneath *and wholly within the confines of* the work supporting base 13 and project slightly through the opening 30 and engage the under face of the fabric being stitched.

The lower toothed feed roller 28 is intermittently rotated by the sewing machine drive mechanism and this motion imparts an intermittent motion to the upper toothed feed roller 25 and a pulling feed to the fabric. The toothed puller feed rollers cooperate with the main feed dog 16 in the proper feeding of the fabric in timed relation to and from the stitching mechanism.

On the lower portion of the carrier rod 23, I have pivotally mounted the yoke bracket 24 by means of screws 33, 34. The yoke bracket 24 has two arms 35, 36 carrying a rod 37 on which the upper toothed feed-roller 25 is rotatably mounted.

A coil spring 40 is mounted on the carrier rod 23 and bears against a collar 41 integral with the carrier rod. The spring 40 reacts at its upper end against an adjustable member 42 threadably mounted in the upper bearing 21. The carrier rod 23 extends through the member 42. By adjusting the threaded member 42, the tension on the spring 40 may be varied.

The coil spring 40 tensions the carrier rod 23 in a downward direction and yieldingly forces the toothed upper feed roller 25 against the upper face of the fabric and holds the fabric pressed against the toothed lower feed roller 28. The lower portion 46 of the carrier rod 23 is of transversely square cross-section and is movably mounted in the lower bearing 22 which is of transversely square cross-section and this prevents the carrier rod 23 from turning and holds the toothed upper feed roller 25 in operation position, that is, the teeth of the upper feed roller are held in meshed relation with the teeth of the lower feed roller.

The movement of the feed roller 25 to ineffective position or into operative position is accomplished by moving a lever 50 which is fulcrumed on the bracket 20 by a screw 51 journalled in the bracket. The lever 50 has a cam 52 which contacts a pin 53 which is integral with the carrier rod 23 and extends outwardly therefrom. By raising the lever 50 the cam 52 engages and raises the pin 53, the carrier rod 23 and the feed roller 25.

As shown by the line C—C' in Figure 1, the vertical center line of the lower bearing 22 for the upper roller 25 is substantially in alignment with the upright rear edge 54 of the front face of the end plate 19. The bearing means 21, 22 closely approach the cover plate. This permits the rollers to closely approach the needle 14.

Figure 4:
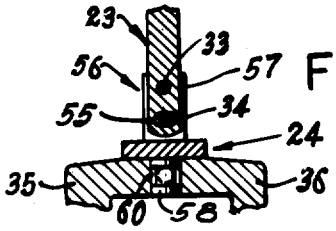
Figure 4 is a cross-sectional view taken on line 4—4 in Figure 2, and showing a two-directional pivotal mounting for the upper toothed wheel.

As best shown in Figure 4, the pivotal mounting for the upper toothed wheel has two-directional motions. The upper screw 33 in the carrier rod 23 permits pivotal motion of the yoke bracket 24 and the toothed wheel 25 along the axis of the toothed wheel and this motion is limited by a horizontal slot 55 in the carrier rod 23 in which the screw 34 freely rides.

It will be noted that the upper portion of the yoke bracket 24 comprising an upper member 56 having two arms 57 which carry the screws 33 and 34. The lower end portion 58 of the upper member 56 has a circular groove 60. A screw 59 threaded in the yoke bracket 24 rides in the groove 60 and permits movement of the toothed wheel 25 in a direction permitting swiveling motion thereof in relation to the lower toothed roller.

Heretofore puller feed rollers did not have pivotal mounting means permitting the upper roller to adjust itself sideways to irregularities in cross seam formation with the result that the puller feeding action was inefficient as regards the maintenance of balanced linear seaming, that is, the pull was not equal on both sides on the line of seam formation. With the two-directional pivotal mounting for the upper toothed wheel a fully efficient puller-feed is provided.

The lower toothed roller 28 is mounted on a shaft 61 which is intermittently rotated by a roller friction clutch which may be of the type shown in Patent Number 1,985,406, issued to Nathan B. Galkin, dated December 25, 1934.

In accordance with the patent statutes I have described and illustrated the preferred embodiment of my invention, but it will be understood that various changes and modifications can be made therein without departing from the spirit of the invention as defined by the appended claims.

I claim:

1. In a unitary roller carrier attachment for an upper toothed roller of a puller-feed of a sewing machine for feeding fabric in coacting timed relation with the feed-dog of the sewing machine and with a driven toothed lower roller in the base of said machine, said base having an opening permitting said lower roller to project slightly above said base, said base providing a planar support for the fabric worked upon from the needle continuously to and beyond said lower roller, said carrier attachment comprising an end plate attachable to the head of the sewing machine solely with the existing head screws and including a bracket extending from the rear wall of said end plate, said end plate having an elongated bearing extension of square cross-section integral therewith for supporting a roller carrier rod for vertical reciprocatory movements, means integral with said rod for maintaining said carrier rod and said upper roller in alignment with said lower roller, and thereby permitting the center line of said elongated bearing extension to be positioned substantially in line with the upright rear edge portion of the front face of said end plate and said rollers to closely approach said needle, a yoke having said upper roller rotatably mounted thereon, said roller carrier rod having a circular upper portion and a lower bearing portion of square cross-section, means on the lower end portion of said carrier rod for pivotally supporting said yoke for limited movement in two directions, said bracket having resilient means urging said yoke in a downward direction to bring said upper toothed wheel in coacting meshed relation with said lower toothed wheel, said pivotal yoke mounting permitting the teeth of said upper toothed wheel to automatically aline with the teeth of said coacting lower toothed wheel, and a lever associated with said carrier rod for raising and lowering said upper toothed wheel respectively from and to effective operating position.

2. In a flat bed sewing machine, in combination, a unitary roller carrier and head cover plate attachment for an upper roller for a puller-feed for feeding fabric in coacting timed relation with the feed-dog of the sewing machine and with a driven lower roller in the base of said machine, a flat work-supporting base, said base having an opening permitting said lower roller to project slightly through said opening above said base, said base providing a planar support for the fabric worked upon from the needle continuously to and beyond said lower roller, said machine having a hollow upper horizontal arm positioned transverse to the line of stitching, said carrier attachment comprising an end plate attachable to the end face of the arm of the sewing machine solely with the existing end plate screws, and including a bracket extending from the rear wall of said end plate lengthwise of said arm, said end plate having an elongated vertical bearing of square cross-section integral therewith for supporting a roller carrier rod centrally of said rollers for vertical movements, said roller carrier rod having a circular upper portion and a lower bearing portion of square cross-section, said elongated bearing being positioned at the lower portion of said end plate and terminating directly above said roller support, means integral with said carrier rod for maintaining said carrier rod and said upper roller in alignment or non-rotative relation with said lower roller, and thereby permitting the center line of said elongated bearing substantially to be positioned in line with the upright rear edge portion of the front face of said end plate and said rollers to closely approach said needle, said bracket extending laterally from one side edge of said end plate and in overlapping relation with said arm, said rod carrying a yoke in which said upper roller is rotatably mounted, said bracket having a coil spring urging said carrier rod and yoke in a downward direction to bring said upper roller in coacting relation with said lower roller, and a lever associated with said carrier rod for raising and lowering said upper roller from and to effective operating position with said lower roller.

3. In a flat bed sewing machine, in combination, a unitary roller carrier and head cover plate attachment for an upper roller for a puller-feed for feeding fabric in coacting timed relation with the feed-dog of the sewing machine and with a driven lower roller in the base of said machine, a flat work-supporting base, said base having an opening permitting said lower roller to project slightly through said opening above said base, said base providing a planar support for the fabric worked upon from the needle continuously to said lower roller, said machine having a hollow upper arm positioned transverse to the line of stitching, said carrier attachment comprising an end plate attachable to the end face of the arm of the sewing machine solely with the existing end plate screws and including a bracket extending from the rear wall of said end plate lengthwise of said arm, said end plate having an elongated vertical bearing of square cross-section integral therewith for supporting a roller carrier rod centrally of said rollers for vertical movements, said roller carrier rod having a circular upper portion and a lower bearing portion of square cross-section, means for maintaining said carrier rod and said upper roller in alinement with said lower roller, the center line of said elongated bearing being substantially in line with the upright rear edge portion of the front face of said end plate to permit said rollers to closely approach said needle, said bracket extending laterally from one side edge of said end plate and in overlapping relation with said arm, said rod carrying a yoke in which said upper roller is rotatably mounted, said bracket having a coil spring urging said carrier rod and yoke in a downward direction to bring said upper roller in coacting relation with said lower roller, and a lever associated with said carrier rod for raising and lowering said upper roller from and to effective operating position with said lower roller.

*4. In a flat bed sewing machine having a hollow head terminating in an open end face, a work-supporting base, a needle and upper and lower feed rollers; a unitary attachment for mounting said upper feed roller, comprising an upper roller carrier and cover plate mounted on said end face, said cover plate having elongated vertical bearing means integral therewith for supporting a roller carrier rod centrally of said rollers for vertical movements, means for maintaining said carrier rod and said upper roller in alignment and in non-rotative relation with said lower roller, the unitary relation of said cover plate and said bearing means permitting said bearing means to be positioned close to said cover plate and said rollers to closely approach said needle, said carrier rod carrying a yoke in which said upper roller is rotatably mounted, a coil spring mounted on said carrier rod and positioned to exert pressure against said carrier rod and against said upper roller to press said upper roller against said lower*

*roller, said bearing means having a sideways extending lever pivotally mounted thereon and adapted for manually raising said carrier rod and said upper roller in a vertical direction, said lower feed roller being positioned wholly within the confines of said work-supporting base, whereby the fabric being stitched has support the entire distance from the needle to said feed rollers, said upper roller carrier and cover plate and said carrier rod and upper roller being secured in unitary relation for removal from said sewing machine head as a unit without disturbing the stitching mechanism, and said sewing machine operated solely by the stitching and feeding mechanism thereof.*

References Cited in the file of this patent or the original patent

UNITED STATES PATENTS

| | | |
|---|---|---|
| 1,406,984 | Horton | Feb. 21, 1922 |
| 1,841,859 | Thobroe et al. | Jan. 19, 1932 |
| 1,883,566 | Christensen et al. | Oct. 18, 1932 |
| 2,092,335 | Sauer et al. | Sept. 7, 1937 |
| 2,254,779 | Myers | Sept. 2, 1941 |
| 2,706,457 | Galkin | Apr. 19, 1955 |